US011923927B2

United States Patent
Kosasih et al.

(10) Patent No.: US 11,923,927 B2
(45) Date of Patent: Mar. 5, 2024

(54) M-MIMO RECEIVER (71) Applicant: THE UNIVERSITY OF SYDNEY, Sydney (AU)

(72) Inventors: Alva Kosasih, Sydney (AU); Wibowo Hardjawana, Sydney (AU); Branka Vucetic, Sydney (AU)

(73) Assignee: THE UNIVERSITY OF SYDNEY, Sydney (AU)

( * ) Notice: Subject to any disclaimer, the term of this patent is extended or adjusted under 35 U.S.C. 154(b) by 0 days.

(21) Appl. No.: 17/771,298

(22) PCT Filed: Oct. 26, 2020

(86) PCT No.: PCT/AU2020/051150
§ 371 (c)(1),
(2) Date: Apr. 22, 2022

(87) PCT Pub. No.: WO2021/077177
PCT Pub. Date: Apr. 29, 2021

(65) Prior Publication Data
US 2022/0393726 A1    Dec. 8, 2022

(30) Foreign Application Priority Data

Oct. 24, 2019   (AU) ................................ 2019904006

(51) Int. Cl.
*H04L 23/02*     (2006.01)
*H04B 1/10*     (2006.01)
(Continued)

(52) U.S. Cl.
CPC ......... *H04B 7/0452* (2013.01); *H04B 1/1027* (2013.01); *H04B 7/0854* (2013.01); *H04B 7/0857* (2013.01)

(58) Field of Classification Search
CPC ................ H04L 1/005; H04L 25/0202; H04L 25/03292; H04L 25/03006; H04B 7/0425; H04B 7/0413
USPC ........................................ 375/262, 260, 265
See application file for complete search history.

(56) References Cited

U.S. PATENT DOCUMENTS 6,188,915 B1   2/2001   Martin et al.
8,559,498 B1 *   10/2013   Eliaz ...................... H04L 1/005
                                                             375/233

(Continued)

FOREIGN PATENT DOCUMENTS

CN     108833060 A    11/2018

OTHER PUBLICATIONS

International Search Report from International Application No. PCT/FR2021/051784 dated Dec. 10, 2020, 4 pgs.

(Continued)

*Primary Examiner* — Khai Tran
(74) *Attorney, Agent, or Firm* — Tutunjian & Bitetto, P.C.

(57) ABSTRACT

A method for detecting transmitted data in a multiple-input multiple-output (MIMO) receiver, the method comprising: iteratively calculating symbol estimates by: obtaining input symbol estimates and input symbol variances; calculating error values for the input symbol estimates; refining the input symbol estimates to obtain refined symbol estimates, based on the error values, wherein the refined symbol estimates are used as input symbol estimates for the subsequent iteration of the above calculation, and wherein the refined symbol estimates are used as final symbol estimates when the difference between refined symbol estimates from one iteration to the next is below a threshold change.

14 Claims, 3 Drawing Sheets

(51) Int. Cl.
  *H04B 7/0452* (2017.01)
  *H04B 7/08* (2006.01)

(56) References Cited

U.S. PATENT DOCUMENTS

| | | | |
|---|---|---|---|
| 9,363,111 B1* | 6/2016 | Sun | H04L 25/03146 |
| 2008/0089450 A1* | 4/2008 | Zelst | H04L 27/0014 |
| | | | 455/317 |
| 2011/0292974 A1* | 12/2011 | Lamba | H04J 13/0048 |
| | | | 375/E1.032 |

OTHER PUBLICATIONS

Australian Examination Report from Australian Application No. 2020369979 dated Dec. 15, 2022, 4 pgs.
Cepedes J et al.: "Expectation Propagation Detection for High-Order High-Dimensional MIMO System", IEEE Transactions on Communications, Aug. 2014 (Aug. 1, 2014), pp. 2840-2849, vol. 62, No. 8, IEEE.
Cespedes J et al., "Probabilistic MIMO Symbol Detection with Expectation Consistency Approximate Inference", IEEE Transaction on Vehicular Technology, Dec. 2017, pp. 3481-3494, vol. 67, No. 4, IEEE.
Latva-Aho Mand Lilleberg J, "Parallel Interference Cancellation in Multiuser Detection", in Proceedings of International Symposium on Spread Spectrum Techniques and Applications, (ISSSTA'95), Mainz, Germany, Sep. 25, 1996, IEEE.
Australian Examination Report from Australian Application No. 2020369979 dated Sep. 28, 2023,3 pgs.

* cited by examiner

M-MIMO RECEIVER

PRIORITY CLAIM

The present application is a national phase filing of International Application No. PCT/AU2020/051150, filed on Oct. 26, 2020, which claims priority to Australian Provisional Patent Application No. 2019904006, filed on Oct. 24, 2019, the entire contents of each of which are incorporated herein by reference and relied upon.

FIELD OF THE INVENTION

The present invention relates to wireless communication. The invention specifically, relates to methods and apparatus suitable for use in massive multiple-input-multiple-output (M-MIMO) communication systems. Although the invention may provide particular advantages in such environments, the invention may also be used in other communication systems.

BACKGROUND

Any discussion of the prior art throughout the specification should in no way be considered as an admission that such prior art is widely known or forms part of the common general knowledge in the field.

The use of MIMO techniques has become increasingly important in wireless communications. These use multiple antennas at transmitter and receiver, which allow parallel data streams to be transmitted between receivers/transmitters over different channels. This allows for high rate data transfers using parallel data streams over available spatial channels.

However, as the number of users and antennas increases, the design of massive multiple-input-multiple-output (M-MIMO) receivers becomes very challenging, due to stringent reliability and processing latency requirements in ultra-reliable-low-latency-communication (URLLC). M-MIMO technology plays a prominent role in the current wireless systems in increasing the number of connections and the spectral efficiency by using a large number of antennas. As the number of antennas increases, the computational complexity of symbol detection at an M-MIMO receiver increases as well. High computational complexity leads to a long processing delay. Essentially, there is a trade-off between the detection reliability and the processing delay. Improving the fundamental trade-off between reliability and processing delay is particularly relevant for the fifth generation (5G) cellular network.

Recent attempts have been made to improve the detection reliability in minimum-mean-square-error (MMSE) linear receivers. However, the latency processing time is still a major concern, due to the exponential complexity of matrix inversion operations in MMSE schemes.

Massive multiple-input-multiple-output (M-MIMO) technology has been proposed to support ultra reliability and low latency (URLLC) data transmissions. The reduction of minimum transmission time intervals (TTI) and bit-error-rate (before coding) requirements from 15 ms and 10-3 to 1 ms and 10-5 in 4G and 5G NR URLLC, respectively, pose a challenging problem in developing an M-MIMO receiver.

Three types of M-MIMO receivers have been investigated in the literature; non-linear, linear, and Bayesian learning receivers. While non-linear receivers (e.g. maximum likelihood (ML) receivers) can achieve an optimal symbol detection reliability, they suffer from a high computational complexity. This is due to an exhaustive search operation to find the ML combinations of user symbols. This leads to a long detection processing time and thus a high latency.

Various types of linear M-MIMO receivers have also been tried, but many of these still rely on matrix inversion operations to cancel multiple user interference, which leads to an exponential increase in computational complexity with the number of antennas. In general, linear receivers also exhibit poor detection reliability when compared to an ML receiver.

Recently, attempts have been made to introduce Bayesian learning concepts, to reduce the reliability performance gap between ML and linear receivers. However, while there is a performance improvement compared to MMSE receivers, matrix inversion operations are required, which again results in exponential latency processing at the receivers. In addition, Bayesian leaning parameters often need to be fine tuned prior to deployment, to get the best performance in different scenarios, but this is particularly difficult in wireless environments. Accordingly, there are significant challenges in enabling Bayesian learning schemes to operate in real-time, and to operate in real-world situations.

There is accordingly a need for apparatus and methods which addresses some or all of the above issues, or at least provides an alternative to conventional apparatus and methods used in M-MIMO communication systems.

SUMMARY OF THE INVENTION

In a first aspect of the present invention, there is provided a method for detecting transmitted data in a multiple-input multiple-output (MIMO) receiver, the method comprising:
  iteratively calculating symbol estimates by:
    obtaining input symbol estimates and input symbol variances;
    calculating error values for the input symbol estimates;
    refining the input symbol estimates to obtain refined symbol estimates, based on the error values,
  wherein the refined symbol estimates are used as input symbol estimates for the subsequent iteration of the above calculation, and
  wherein the refined symbol estimates are used as final symbol estimates when the difference between refined symbol estimates from one iteration to the next is below a threshold change.

The calculations to obtain the input symbol estimates are preferably free from matrix inversion operations. This significantly reduces the computational complexity of the method, compared to existing Bayesian learning receivers. In particular, obtaining the input symbol estimates may comprise utilising a parallel interference cancellation (PIC) scheme to remove interference, whereby the use of the parallel interference cancellation scheme avoids using a matrix inversion operation.

The input symbol estimates may be obtained by applying a maximum ratio combining scheme to signals received by the receiver (e.g. from a plurality of antennas).

The calculation of error values may comprise:
  constructing maximum likelihood Gaussian distribution functions based on the input symbol estimates and the input symbol variances;
  calculating soft symbol estimates based on the likelihood Gaussian distribution functions; and
  computing error values based on the difference between the input symbol estimates and the soft symbol estimates.

The refined symbol estimates may be calculated by weighting the soft symbol estimates based on the current and previous iterations based on the error values.

In a second aspect of the present invention, there is provided a method for detecting transmitted data in a multiple-input multiple-output (MIMO) receiver, the method comprising:
  obtaining, by a symbol observation module, input symbol estimates;
  calculating, by a symbol estimate module, symbol error values;
  calculating, by a decision statistic combining module, refined symbol estimates based on the calculated symbol errors and the input symbol estimates.

The method may be repeated iteratively until the refined symbol estimates from one iteration are sufficiently close to the refined symbol estimates from the previous iteration, whereupon the refined symbol estimates may be used as final symbol estimates.

As previously stated, the calculations to obtain the input symbol estimates are preferably free from matrix inversion operations. This significantly reduces the computational complexity of the method, compared to existing Bayesian learning receivers. In particular, obtaining the input symbol estimates may comprise utilising a parallel interference cancellation (PIC) scheme to remove interference, whereby the use of the parallel interference cancellation scheme avoids using a matrix inversion operation.

As previously stated, the input symbol estimates may be obtained by applying a maximum ratio combining scheme to signals received by the receiver.

As previously stated, the calculation of error values may comprise:
  constructing maximum likelihood Gaussian distribution functions based on the input symbol estimates and the input symbol variances;
  calculating soft symbol estimates based on the likelihood Gaussian distribution functions; and
  computing error values based on the difference between the input symbol estimates and the soft symbol estimates.

As previously stated, the refined symbol estimates may be calculated by weighting the soft symbol estimates based on the current and previous iterations based on the error values.

In a third aspect of the present invention, there is provided an apparatus for use in a wireless communication system comprising:
  a plurality of antennas;
  at least one processor coupled to the plurality of antennas and configured to perform processing of communications received via the antennas, as claimed in either the first or second aspect of the invention.

In a fourth aspect of the present invention, there is provided an apparatus for use in a wireless communication system comprising:
  a plurality of antennas to receive signals;
  a first module to obtain input symbol estimates and input symbol variances from the received signals;
  a second module to calculate symbol errors for the input symbol estimates; and
  a third module to calculate refined symbol estimates based on the calculated symbol errors and the input symbol estimates.

The first module may be a symbol observation module. The second module may be a symbol estimate module. The third module may be a decision statistic combining module.

The apparatus of the present invention may further be integrated with a polar code decoder. The polar code decoder may be a low-complexity polar code decoder.

It will be appreciated that, unless otherwise stated, details and variations described with respect to one aspect of the invention equally apply to other aspects of the invention.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF THE DRAWINGS

Embodiments of the invention will now be described by way of example only with reference to the accompanying drawings.

DETAILED DESCRIPTION

Figure 1:
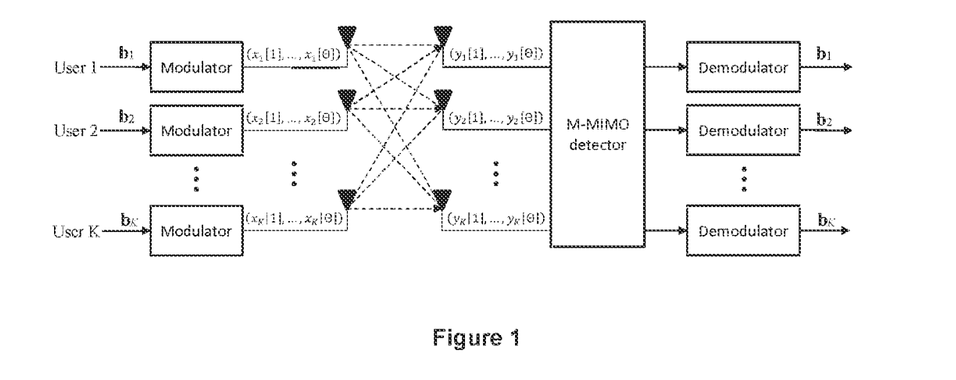
FIG. 1 is a system model of an apparatus according to an embodiment of the present invention.

In an embodiment of the present invention, there is provided an iterative M-MIMO receiver 100 referred to as linear Bayesian learning (LBL) receiver 100 to cater for higher reliability and lower latency requirements in URLLC traffic, by numerous users 200.

Figure 2:
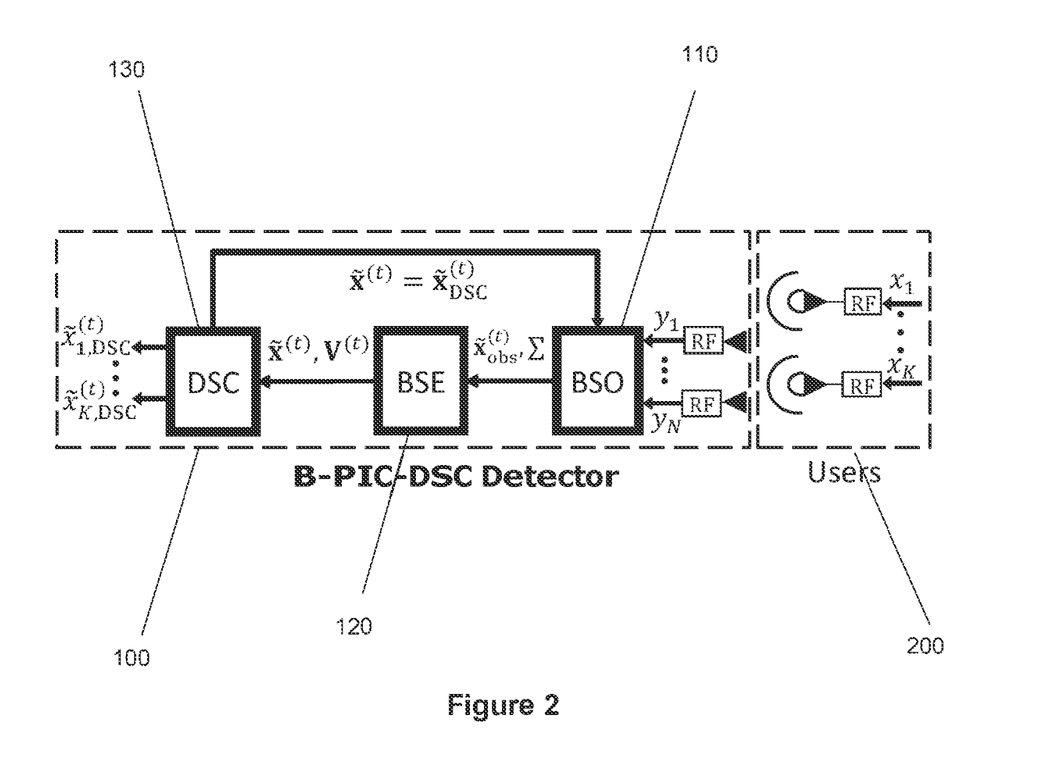
FIG. 2 is a schematic representation of a B-PIC-DSC detector of the apparatus of FIG. 1.

The developed LBL receiver 100 consists of three modules:
  a Bayesian symbol observation (BSO) module 110;
  a Bayesian symbol estimate (BSE) module 120; and
  a decision statistic combining (DSC) module 130.

The function of each module will be described in more detail in subsequent paragraphs. However, as a general overview:
  the BSO module 110 applies a maximum ratio combining scheme to received signals, to obtain observed symbols. For each observed symbol, a parallel interference cancellation (PIC) scheme is then used to remove its interference. The symbol variance is also calculated.
  the BSE module 120 takes the observed symbols and the symbol variances, and constructs maximum likelihood Gaussian distribution functions, which are used to calculate soft symbol estimates. The symbol error between the observed symbols and the soft symbol estimates can then be calculated.

the DSC module 130 takes the value of symbol errors, and uses them to calculate refined symbol estimates. The process is repeated iteratively, where the DSC module refines the symbol estimates by using the outputs from the BSE module 120, and returns the refined estimates to the BSO module 110. In producing refined estimates, the DSC module 130 in this embodiment uses the symbol error values from current and previous iterations of the process.

There are some particular advantages that may be provided by this embodiment of the invention 100. In particular, the BSO module 110 uses a PIC scheme to remove interference. This allows this embodiment of the invention to avoid matrix inversion operations or approximations, which are computationally very expensive, and thereby reduce latency compared to prior art receivers.

In addition, this embodiment of the invention derives learning parameters directly from the symbol errors between estimations and observations in different iterations, in contrast to prior trial and error approaches.

Notations

Further details of the invention are described in more detail below. However, to provide a guide to understanding the description, the following notations are used.

I denotes a proper size identity matrix. For any matrix A, $A^T$ is the transpose of A, $A^H$ is the conjugate transpose of A, and tr(A) denotes the traces of A. $\|q\|$ denotes the Frobenius norm of vector q. $q^*$ denotes the complex conjugate of a complex number q. $E[x]$ is the mean of random vector x and $Var[x]=E(x-E[x])^2$ is its variance. $N(x_k,c_{k1},v_k)$ represents a complex single variate Gaussian distribution of random variable $x_k$ with mean $c_k$ and variance $v_k$. By letting $x=[x_1,\cdots,x_K]^T$, $c=[c_1,\cdots,c_K]^T$, the multivariate Gaussian distribution of random vector x is denoted as $N(x; c; \Sigma^{(t)})$, where $\Sigma^{(t)}$ is a covariance matrix.

System Model

FIG. 1 depicts an uncoded M-MIMO system used to transmit information streams generated by K single-antenna users. The M-MIMO system includes a modulator located on the user side and an M-MIMO detector together with a demodulator located on a base station. The base station is equipped with a large number of antennas N>>K to simultaneously serve the users. At symbol time θ, user k maps $\log_2(M)$ bits of its information stream $b_k$ to a symbol $x_k[\theta] \in \Omega$ using a quadrature amplitude modulation (QAM) technique, where $\Omega=[s_1, \ldots, \ldots, s_M]$ is a constellation set of M-QAM and $s_m$ is one of the constellation points. We assume that the channel state information (CSI) is available at the receiver side and the transmitted symbols are uniformly distributed. The received signal at symbol time is given by Consider an M-MIMO receiver (at a base station) that receives uplink signals from K users, each with a single antenna, as depicted in FIG. 1, in transmitter side. The receiver is equipped with a large number of antennas N>>K. Each user first maps its information bit stream to a symbol $x_k$ that belongs to a constellation point of M-QAM, $\Omega_k \in [\Omega_1, \ldots, \Omega_K]$. $\|\Omega\|=M$, and $x=[x_1, \ldots, x_K]^T$. The average symbol energy is $E_x=E\{|x_k|^2\}$. In the receiver side, the received signal at the M-MIMO receiver, $y=[y_1 \ldots y_N]^T$ where $y_n$ is the received signal at antenna n, which can then be written as:

$$y[\theta]=H[\theta]x[\theta]+\epsilon[\theta], \quad (1)$$

where $x[\theta]=[x_1[\theta],\ldots,x_k[\theta]]^T$, $y[\theta]=[y_1[\theta],\ldots,y_k[\theta]]^T$, $H[\theta]=[h_1[\theta], \ldots, h_k[\theta]]^T \in C^{N \times K}$ is the coefficients of complex memoryless Rayleigh wireless channels between K transmit antennas (froim K users) and N receove antennas (at M-MIMO receiver), $1 \leq \theta \leq \Theta$, $h_k[\theta]$ is the k-th column vector of matrix $H[\theta]$ that denotes wireless channel coefficients between receiver antennas and user k. $\epsilon[\theta] \in C^N$ denotes the additive white Gaussian noise (AWGN) with a zero mean and covariance matrix $\sigma^2$. I. The SNR of the system is defined as $$SNR = 10 \log_{10}\left(\frac{KE_s}{\sigma^2}\right)dB,$$

where $E_s$ is the energy per transmit antenna. We normalize the total transmit energy such that $KE_s=1$. The channels between all transmit-receive antenna pairs are assumed to be independent memoryless Rayleigh fading channels. Transmitted vectors $x[\theta]$, $1 \leq \theta \leq \Theta$, are uncorrelated in case of uncoded transmission, which allows us to omit the symbol time θ hereafter for notational simplicity.

Given a received vector $y \in C^N$, the optimal detector, realised using the MAP decision rule, finds $$\hat{x} = \arg\max_{X \in \Omega} p(x \mid y) \quad (2)$$
$$= \arg\min_{X \in \Omega} \|y - Hx\|^2.$$

However, the computational comlexity of the optimal detector in (2) grows exponentially with the number of users, which causes practical implementation difficultes in M-MIMO systems. Previously, a MMSE detector is used to relax the computational complexity of the optimal detectors wherein the symbols are approximated as $$\hat{x} \approx (H^H H + \sigma^2 I)^{-1} H^H y, \quad (3)$$

However, the matrix inversion operation used in (3) is still costly as its compexity increases polynomially with the number of recceive antennas.

In contrast to the MMSE scheme, the iteratve matched filter based PIC scheme can be used to avoid the matrix inversion operations by using the matched filter and PIC concepts. Specifically, the estimation of the symbol of user k in iteration t, $x_{PIC,k}^{(t)}$ is given as $$x_{PIC,k}^{(t)} = \frac{h_k^H\left(y - Hx_{PIC,k}^{(t-1)}\right)}{\|h_k\|^2}, \quad (4)$$

where $x_{PIC,k}^{(t-1)}=[x_{PIC,1}^{(t-1)}, \ldots, x_{PIC,k-1}^{(t-1)},$
$0, x_{PIC,k+1}^{(t-1)}, \ldots, x_{PIC,K}^{(t-1)}]^T$ are the estimated symbols in the (t−1)-th iteration.

M-MIMO Receiver 100 of the Present Invention

The present invention provides a novel Bayesian PIC-DSC detector referred to as a B-PIC-DSC detector (for LBL receiver) to be employed in an uplink M-MIMO system, illustrated in FIG. 1. The structure of the B-PIC-DSC detector is shown in FIG. 2. As previously explained, it consists of three modules: a BSO module that computes the PDFs of the detected symbols from the received signals by using the matched filter based PIC scheme; a BSE module that obtains the Bayesian symbol estimates based on the computed PDFs; and a DSC module that refines the transmitted symbol estimates by using the outputs of the BSE module and returns the refined symbols to the BSO module. Note that the matched filter based PIC interference canceller in the B-PIC-DSC detector allows us to avoid the MMSE matrix inversion operations used in prior art Bayesian detectors.

BSO Module 110

In the BSO module, x in (1) is treated as a random vector. According to Bayesian rule, the posterior probability of the transmitted symbols x given the received signals y can be expressed as follows $$p(x \mid y) = \frac{p(y \mid x)p(x)}{p(y)} \quad (5)$$

where $p(y|x) = N(y; Hx; \sigma^2 I)$. Since the transmitted symbols are uniformly distributed, $p(x|y)$ in (5) can be simplified as $$p(x|y) \propto \mathcal{N}(y, Hx; \sigma^2 I). \quad (6)$$

Obtaining symbol estimates by using MAP criterion (2) with $p(x|y)$ from (6) is an NP hard problem. However, we can approximate $p(x|y)$ by using a Bayesian posterior approximation $$p(x \mid y) \approx \prod_{k=1}^{K} \underbrace{\mathcal{N}\left(x_k, x_{PIC,k}^{(t)}; \Sigma_k^{(t)}\right)}_{\hat{p}^{(t)}(x_k \mid y)} \quad (7)$$

where $x_{PIC,k}^{(t)}$ is the t-th approximation of the mean of $x_k$ which is given in (4) as we use the matched filter based PIC scheme to detect the symbols and $\Sigma(t)$ k is the variance of the k-th symbol, derived as $$\Sigma_k^{(t)} = \frac{1}{\left(\sum_{n=1}^{N} h_{n,k}^* h_{n,k}\right)^2} \left( \sum_{j=1, j \neq k}^{K} s_j^2 V_j^{(t-1)} + \sum_{n=1}^{N} (h_{n,k}^* h_{n,k}) \sigma^2 \right). \quad (8)$$

Here, $s_j = \sum_{n=1}^{N} h_{n,k}^* h_{n,j}$, $j \neq k$ and $V_j^{(t-1)}$ is the variance of the Bayesian symbol estimator in iteration t−1, discussed later in this specification. We set $V_j^{(0)}=1$ since the PIC scheme is inactive at the first iteration. The approximations of the posteriori distributions, $\hat{p}^{(t)}(x_k|y) = \mathcal{N}(x_k, x_{PIC,k}^{(t)}; \Sigma_k^{(t)})$, k=1, ..., K are then forwarded to the the BSE module, as shown in FIG. 2.

BSE Module 120

The BSE module 120 computes the soflt symbol estimate, $\hat{x}_k^{(t)}$ and of the k-th user by using $\hat{p}^{(t)}(x_k|y)$ where its mean and variance are given in (4) and (8), respectively. Since $\hat{p}^{(t)}(x_k|y)$ is the PDF of an i.i.id. Gaussian distribution, we can decompose the MAP criterian, given in (2), using (7) as $$\hat{x}_k^{(t)} = \arg\max_{x_k \in \Omega} \hat{p}^{(t)}(x_k \mid y) \quad (9)$$

Note that Note that with the Bayesian framework, we can approximate the computationally complex MAP criterion in (2) with the expression in (9) which has a linear computational complexity. The Bayesian symbol estimate and its variance which maximizes ^p(t)(xkjy) in (9) are respectively $$\hat{x}_k^{(t)} = E\left[x_k \mid x_{PIC,k}^{(t)}, \Sigma_k^{(t)}\right] = \sum_{x_k \in \Omega} x_k \hat{p}^{(t)}(x_k \mid y) \quad (10)$$

$$V_k^{(t)} = \text{Var}\left[x_k \mid x_{PIC,k}^{(t)}, \Sigma_k^{(t)}\right] = E\left[\left|x_k - E\left[x_k \mid x_{PIC,k}^{(t)}, \Sigma_k^{(t)}\right]\right|^2\right] \quad (11)$$

where $\hat{p}^{(t)}(x_k|y) = \hat{p}^{(t)}(x_k|y)/\Sigma_{x_k \in \Omega} \hat{p}^t(x_k|y)$, The ouuts of the BSE module, $\hat{x}_k^{(t)}$ and $V_k^{(t)}$ are then sent to the DSC module.

DSC Module 130

In the DSC module 130, shown in FIG. 2, the symbol estimates are refined by weighting the outputs of the BSE module. In the matched filter based PIC scheme, the interference canceller is inactive in the first iteration and thus the inter-symbol interference is very high. From the second iteration, the symbol estimates approach the corresponding transmitted symbols as the interference is gradually mitigated. Consequently, the value of $\hat{x}_k^{(t)}$ varies significantly in the first few iterations and hence the correlation between $\hat{x}_k^{(t)}$ and $\hat{x}_k^{(t-1)}$ is low when t is small.

Such a feature can be exploited to increase the diversity of symbol estimates by forming decision statistics. The decision statistics consist of a linear combination of the symbol estimates in two consecutive iterations:

$$x_{DSC,k}^{(t)} = (1-\rho_{DSC,k}^{(t)})\hat{x}_k^{(t-1)} + \rho_{DSC,k}^{(t)}\hat{x}_k^{(t)} \quad (12)$$

$$V_{DSC,k}^{(t)} = (1-\rho_{DSC,k}^{(t)})V_k^{(t-1)} + \rho_{DSC,k}^{(t)}V_k^{(t)} \quad (13)$$

As illustrated in FIG. 2, $x_{DSC,k}^{(t)}$ and $V_{DSC,k}^{(t)}$ are computed in the DSC module 130.

This helps avoid the need for trial and error for finding optimal learning parameters, in contrast to other Bayesian learning iterative receivers. In this embodiment of the invention, the DSC concept is leveraged to avoid the trial and error processes. Specifically, the weighting coefficients in the linear combinations are determined by maximising the SINR. In the iteration t, the k-th coefficient is given as $$\rho_{DSC,k}^{(t)} = \frac{e_k^{(t-1)}}{e_k^{(t)} + e_k^{(t-1)}} \quad (14)$$

where $e_k^{(t)}$ is defined as the instantaneous square error of the k-th symbol estimate which can be computed by using a linear filter such as matched or zero forcing (ZF) filter. That is $$e_k^{(t)} = \|w_k^H(y - H\hat{x}^{(t)})\|^2 \quad (15)$$

where $w_k$ is the k-th column vector of the linear filter for user k.

For the B-PIC-DSC detector, we use the matched filter, $$w_k^H = \frac{h^H}{\|h\|^2}.$$

The iterative process will stop if the following condition is satisfied, $$\|x_{DSC,k}^{(t)} - x_{DSC,k}^{(t-1)}\| \leq \zeta \text{ or } t = T_{max}, \quad (16)$$

where $\zeta$ is the threshold defining the minimum acceptable difference of $x_{DSC,k}^{(t)}$ in two consecutive iterations, and $T_{max}$ is the maximum number of iterations. We then use $x_{DSC,k}^{(t)}$ and $V_k^{(t)}$ as the input of the BSO module in the next iteration, $$x_{PIC,k}^{(t)} = x_{DSC,k}^{(t)}, \text{ and } V_k^{(t)} = V_{DSC,k}^{(t)} = 1, \ldots, K. \quad (17)$$

The complexity of the above described embodiment of the invention (the LBL receiver 100) only increases linearly with the number of antennas (N) and users (K) by avoiding matrix inversion operations. This is in contrast to many conventional receivers where the computational complexity grows exponentially with N and/or K. Therefore, the LBL receiver 100 is likely to have significantly lower processing latency, and thus is likely to be more suitable for URLLC data traffic.

Figure 3:
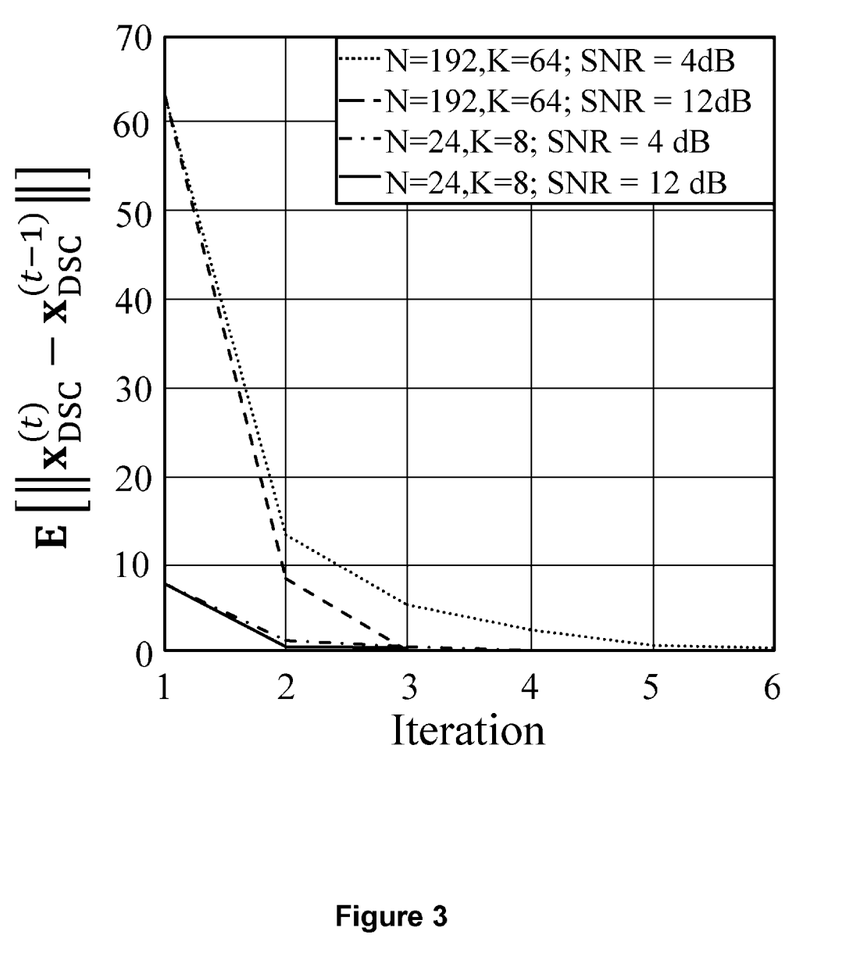
FIG. 3 is a graph providing a convergence analysis of the apparatus of FIG. 1.

FIG. 3, for example, shows that the maximum number of interations needed for increasing antennas, users and SNR configurations (in the numbers set out in FIG. 3 and using the above embodiment of the invention) will only be six, which implies that the number of iterations needed to produce final symbol estimates will be relatively insensitive to the system configurations.

Figure 4:
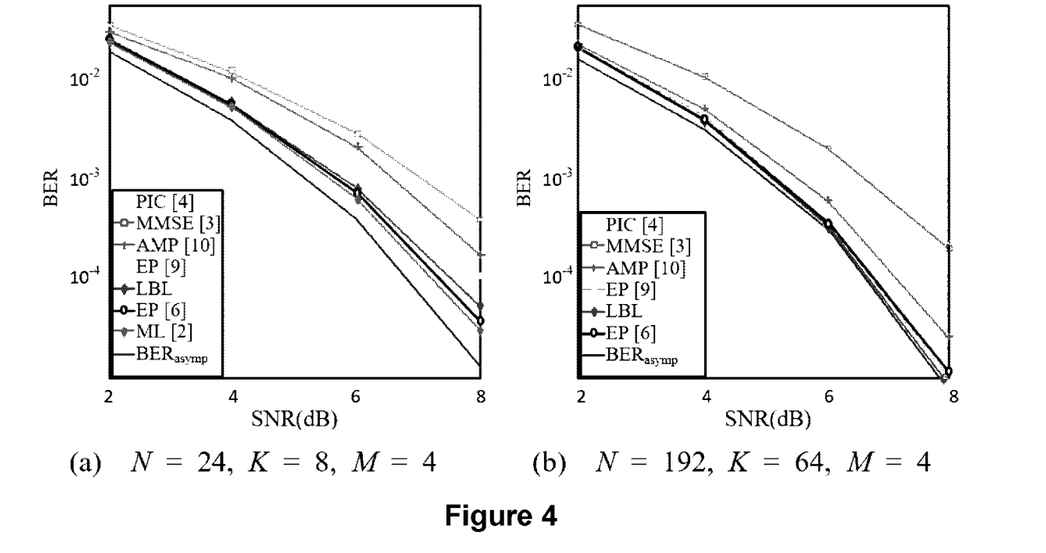
FIG. 4 graphically depicts the simulated bit error rate performance of the apparatus of FIG. 1, in comparison to other types of receivers.

In FIGS. 4(a) and 4(b), the simulated bit error rate (BER) performance is depicted in comparison to existing linear receivers based on PIC and MMSE schemes; Bayesian learning receivers based on expectation propagation (EP) and approximate message passing (AMP) schemes; an optimal ML receiver. The calculated BER lower bound for the LBL receiver is also shown.

Accordingly, it is anticipated that the LBL receiver 100 of the present inventions provides advantages of several existing classical and advance iterative receivers. It is anticipated that the BER performance of LBL receiver 100 will be close to that of a maximum likelihood receiver, while maintaining linear latency processing time in contrast to other existing schemes used in other receivers.

The above embodiment of the invention constitutes an iterative M-MIMO receiver/detector that is developed by using a Bayesian concept and a parallel interference cancellation (PIC) scheme. The simulation results show that the bit-error-rate (BER) and latency processing performances of the above M-MIMO receiver outperform conventional systems for various M-MIMO system configurations.

Embodiments of the present invention provide lower processing time (latency) compared to many conventional M-MIMO receivers, as there is no matrix inversion. Embodiments of the invention may also provide higher reliability, near to the optimal receiver (maximum likelihood).

The present invention may be used as a detection technique in current 4G/5G networks as well as future 6G networks. It may be suitable to address the low latency (due to the reduction in transmission processing time requirements in 5/6G cellular networks) and high reliability needed to support industrial automation, not addressed by current receiver designs.

Improvements and Optimisations

In the first iteration, the proposed B-PIC-DSC detector relies on the matched filter to produce the symbol observations. To improve the performance of the B-PIC-DSC detector, one option is to provide an improved B-PIC-DSC (IB-PIC-DSC) detector that applies the MMSE scheme only in the first iteration. Specifically, in the first iteration, the detected symbols in the IB-PIC-DSC detector are obtained from the MMSE scheme $$x_{PIC}^{(0)} = (H^H H + \sigma^2 I)^{-1} H^H y = W^H y. \quad (18)$$

The k-th row of MMSE matrix $W^H$ denoted by $w_k^H$ is then used to calculate the approximation of instantaneous errors. For $t \geq 1$, the IB-PIC-DSC detector performs identical computations as the B-PIC-DSC detector. It is worth noting that the IB-PIC-DSC detector performs the inverse matrix operation only in the first iteration. This is different from the EP and MMSE-SIC detectors which calculate the inverse matrix operation in every iteration.

Polar Coded M-MIMO Receiver

Figure 5:
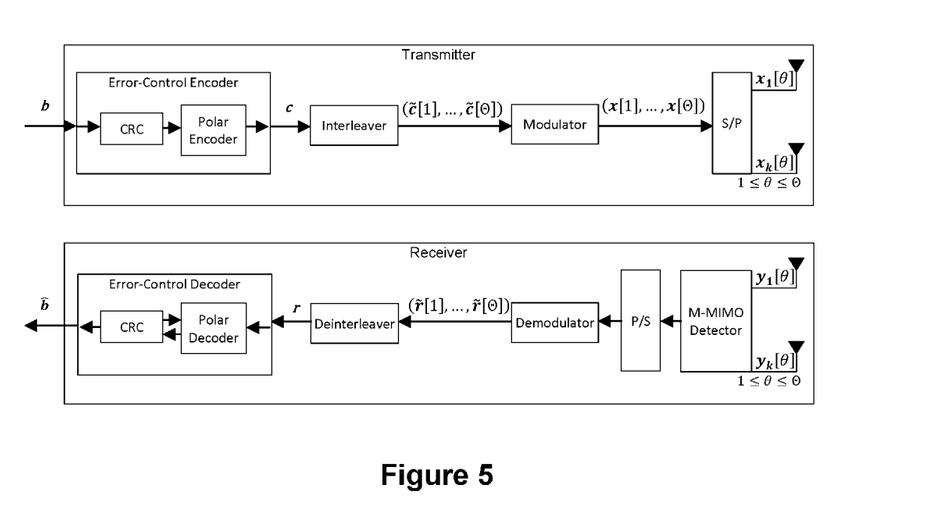
FIG. 5 is a schematic representation of a transmitter and receiver of an apparatus according to another embodiment of the invention.

With reference to FIG. 5, there is further provided another embodiment of the invention, comprising a high performance M-MIMO receiver to support short packet transmissions for URLLC services, where polar codes are used. The B-PIC-DSC detector described above is integrated with a low-complexity polar code decoder. Note that to deploy the IB-PIC-DSC detector in a polar coded system, we only need to set the initially detected symbols as in (18).

Referring to FIG. 5, at the transmitter side, an error-control encoder produces a binary codeword c of length $\eta = m \cdot K \cdot \Theta$ for a given binary information vector b of length $\kappa = \eta \cdot R$, where $m = \log_2 M$, R is the code rate and $\Theta$ is an integer parameter. Bits of the codeword c are shuffled by an interleaver and split into $\Theta$ blocks of $m \cdot K$ bits to produce a sequence $(\tilde{c}[1], \ldots, \tilde{c}[\Theta])$. Then, a modulator maps groups of m bits of the interleaved codeword $(\tilde{c}[1], \ldots, \tilde{c}[\Theta])$ to the symbols of the signal constellation. The resulting sequence $(x[1]; \ldots x[\Theta])$ is parallelized into K streams $(x_k[1], \ldots, x_k[\Theta])$ by a serial-to-parallel converter (S/P), $1 \leq k \leq K$. Each stream $(x_k[1], \ldots, x_k[\Theta])$ is further transmitted to the receiver by the k-th antenna during $\Theta$ time slots, $1 \leq k \leq K$. Transmission can be performed through Rayleigh fading channel with M-QAM modulation.

A received signal block $y[\theta]$ corresponding to transmitted block $x[\theta]$ is described by (1), where the MIMO channel at the $\theta$-th time slot is characterized by the N×K matrix $H[\theta]$. The signal blocks $y[\theta]$, $1 \leq \theta \leq \Theta$ are independently processed by the B-PIC-DSC detector, which is illustrated in FIG. 2. For each $\theta$, the B-PIC-DSC detector iteratively computes (4), (8)-(13) to yield $x_{PIC,k}^{(T)}[\theta]$ and its variance $\Sigma_k^{(T)}[\theta]$, which are further used by the demodulator now to compute LLR for the q-th bit of the k-th user symbol transmitted in the time slot $\theta$ according to $$\tilde{r}_{(k-1)m+q}[\theta] = \log \frac{\sum_{x_k[\theta] \in \Omega_q^{(0)}} \mathcal{N}(x_k[\theta], x_{PIC,k}^{(T)}[\theta]; \Sigma_k^{(T)}[\theta])}{\sum_{x_k[\theta] \in \Omega_q^{(1)}} \mathcal{N}(x_k[\theta], x_{PIC,k}^{(T)}[\theta]; \Sigma_k^{(T)}[\theta])},$$

where $1 \leq k \leq K$, $1 \leq q \leq m$ and $\Omega_q^{(0)}$ and $\Omega_q^{(1)}$ are the subsets of $\Omega$ consisting of the constellation points corresponding to user's symbols with the q-th bit equal to 0 and 1, respectively. The LLRs $\tilde{r}[\theta] = (\tilde{r}[\theta], \ldots, \tilde{r}_{K \cdot m}[\theta])$, $1 \leq \theta \leq \Theta$ are combined into a single sequence and deinterleaved. The resulting sequence r consisting of $m \cdot K \cdot \Theta$ LLRs is sent to a polar code decoder to compute an estimate $\hat{b}$ of the original information vector b.

A $(\eta=2^\mu, \kappa)$ polcar code is a linear block code generated by k rows of the matrix $B_\eta \cdot G_2^{\otimes \mu}$, where $$G_2 = \begin{pmatrix} 1 & 0 \\ 1 & 1 \end{pmatrix}, \mu \in \mathbb{N}, \otimes \mu,$$

denotes µ-times Kronecker product of a matrix with itself and $B_n$ is an n×n bit reversal permutation matrix. Any codeword of a polar code can be represented as $c = u \cdot B_\eta \cdot G_2^{\otimes \mu}$, where $u = (u_1, \ldots, u_n)$ is an input sequence, such that $u_i = 0$, $i \in \mathcal{F}$, where $\mathcal{F} \subset \{1, \ldots, \eta\}$ is the set of n−k indices of frozen bits. The remaining k elements of u are set to the information bits.

Sequential Decoding of Polar Codes and Integration

A channel between the polar code encoder and decoder can be denoted as $W^n: \{0,1\}^n \to \mathbb{R}^n$. Given a polar code C and a received vector r, the decoding problem consists in finding $\hat{c} = \mathrm{argmax}_{c \in C} W^n(c|r)$. This problem is equivalent to finding $\hat{u} = \mathrm{argmax}_u W^n(u|r)$ since $c = u \cdot B_\eta \cdot G_2^{\otimes \mu}$, where maximisation is performed over the set of vectors $u \in \{0,1\}^n$ satisfying constraints imposed by F.

Recursive structure of polar codes enables low-complexity decoding using an SC algorithm, and list/stack variations such as a sequential decoding algorithm. These algorithms keep one or several of the most probable paths $u_1^i \triangleq (u_1, \ldots, u_i) \in \{0,1\}^i$ within the code tree and sequentially make decisions on input bits $u_i$ for $i = 1, \ldots, n$, where each path is associated with the corresponding score characterising its probability. Similarly to SCS, the sequential algorithm keeps the paths in a stack (priority queue). At each iteration, the decoder selects for extension path $u_1^i$ with the largest score, and computes the score for path $(u_1^i, 0)$ and, if $(i+1) \notin \mathcal{F}$, also for path $(u_1^i, 1)$, then puts the path(s) into the stack.

Once the decoder constructs L paths of length i, all paths shorter than i are eliminated in order to keep the size of the stack limited. Parameter L is called the list size.

Decoding terminates as soon a path of length n appears at the top of the stack, or the stack becomes empty. Hence, the worst case complexity of such decoding is given by $O(L \cdot \eta \cdot \log \eta)$. Average decoding complexity depends on how path scores are defined.

The sequential decoding algorithm potentially achieves complexity reduction compared to SCS by redefining the score function: simplifying recursive calculation and introducing a bias function to estimate the conditional probability of the most likely codeword of a polar code.

In accordance with a sequential decoding algorithm, a path $u_0^i$ is associated with the following score $$\hat{T}(u_1^i, r) = R(u_1^i, r) \hat{\Omega}(i),$$

where $$R(u_1^i, r) = \max_{u_{i+1}^\eta} P(u_1^\eta | r)$$

-continued $$\hat{\Omega}(i) = \prod_{j \in \mathcal{F}, j > i} (1 - P_j),$$

where $P_j$, is the j-th subchannel error probability, provided that exact values of all previous bits $u_{j'}$, $j' < j$, are available.

Computation of probability $R(u_1^i, r)$ for code of length n reduces to computation of two probabilities for codes of length n/2, i.e.

$$R(u_1^{2i-1}, r_1^\eta) = \max_{u_{2i} \in \{0,1\}} R(u_{1,o}^{2i} \oplus u_{1,e}^{2i}, r_1^{\eta/2}) \cdot R(u_{1,e}^{2i}, r_{\eta/2+1}^\eta),$$

$$R(u_1^{2i}, r_1^\eta) = R(u_{1,o}^{2i} \oplus u_{1,e}^{2i}, r_1^{\eta/2}) \cdot R(u_{1,e}^{2i}, r_{\eta/2+1}^\eta),$$

where $u_{1,o}^i$ and $u_{1,e}^i$ are subsequences of $u_1^i$ consisting of elements with odd and even indices, respectively. The initial values for these recursive expressions are defined by r.

The bias function $\hat{\Omega}(i)$ is equal to the mean value of probability that frozen symbols in the remaining part of input sequence $u_{i+1}^\eta$ are equal to 0. It depends only on n, F (i.e. the code being considered), channel properties and phase i. This approach enables one to compare paths $u_1^i$ of different lengths, and prevent the decoder from switching frequently between different paths.

For any given channel, probabilities $P_j$ for the bias function $\hat{\Omega}(i)$ can be pre-computed offline using density evolution. Min-sum density evolution provides a tradeoff between high accuracy and low-complexity.

It can be seen that $W^n(r|c) = \tilde{W}^n((\tilde{r}[1], \ldots, \tilde{r}[\Theta])|(\tilde{c}[1], \ldots, \tilde{c}[\Theta]))$ is a channel between the interleaver and the deinterleaver. Blocks $\tilde{c}[\Theta]$, $1 \le \theta \le \Theta$, are transmitted independently through a memoryless channel and that $\eta = \Theta \cdot m \cdot K$. Thus, channel $\tilde{W}^n$ can be decomposed into $\Theta$ independent parallel channels $\tilde{W}^{m \cdot K}$, more specifically, $\tilde{W}^n((\tilde{r}[1], \ldots, \tilde{r}[\Theta])|(\tilde{c}[1], \ldots, \tilde{c}[\Theta])) = \Pi_{\theta=1}^\Theta \tilde{W}^{m \cdot K}(\tilde{r}[\theta]|\tilde{c}[\theta])$.

Since we consider an M-MIMO scenario in which the numbers of antennas and users are large, we can employ an approximation $\tilde{W}^{m \cdot K}(\tilde{r}[\theta]|\tilde{c}[\theta]) \approx \Pi_1^K p(x_{PIC,k}^{(T)}[\theta]|x_k[\theta])$, where $p(x_{PIC,k}^{(T)}[\theta]|x_k[\theta]) = \mathcal{N}(x_{PIC,k}^{(T)}[\theta], x_k[\theta]; v^{(T)})$. The obtained noise and interference variance $v^{(T)}$ can be employed to compute the probabilities $P_j$. The probabilities $P_j$ j are further substituted into the bias function for the sequential decoder.

Although various embodiments and improvements within the scope of the invention have been described above, the present invention can also be implemented in numerous ways, including as processes, apparatus, systems, or (non-transitory) computer readable media.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The invention claimed is:

1. A method for detecting transmitted data in a multiple-input multiple-output (MIMO) receiver, the method comprising:
   iteratively calculating symbol estimates by:
   obtaining input symbol estimates and input symbol variances;
   calculating error values for the input symbol estimates; and refining the input symbol estimates to obtain refined symbol estimates, based on the error values, wherein the refined symbol estimates are used as input symbol estimates for the subsequent iteration of the above calculation, and wherein the refined symbol estimates are used as final symbol estimates when the difference between refined symbol estimates from one iteration to the next is below a threshold change.

2. The method of claim 1, wherein calculations to obtain the input symbol estimates are free from matrix inversion operations.

3. The method of claim 2, wherein obtaining the input symbol estimates comprises utilising a parallel interference cancellation scheme to remove interference, whereby the use of the parallel interference cancellation scheme avoids using a matrix inversion operation.

4. The method of claim 1, wherein the input symbol estimates are obtained by applying a maximum ratio combining scheme to symbols received by the receiver.

5. The method of claim 1, wherein the calculation of error values comprises: constructing maximum likelihood Gaussian distribution functions based on the input symbol estimates and the input symbol variances; calculating soft symbol estimates based on the likelihood Gaussian distribution functions; and computing error values based on the difference between the input symbol estimates and the soft symbol estimates.

6. The method of claim 1, wherein the refined symbol estimates are calculated by the soft symbol estimates based on the current and previous iterations based on the error values.

7. A method for detecting transmitted data in a multiple-input multiple-output (MIMO) receiver, the method comprising:

obtaining, by a symbol observation module, input symbol estimates;

calculating, by a symbol estimate module, symbol error values; and calculating, by a decision statistic combining module, refined symbol estimates based on the calculated symbol errors and the input symbol estimates, wherein the method is repeated iteratively until the refined symbol estimates from one iteration are sufficiently close to the refined symbol estimates from the previous iteration, whereupon the refined symbol estimates are used as final symbol estimates.

8. The method of claim 7, wherein calculations to obtain the input symbol estimates are free from matrix inversion operations.

9. The method of claim 8, wherein obtaining the input symbol estimates comprises utilising a parallel interference cancellation scheme to remove interference, whereby the use of the parallel interference cancellation scheme avoids using a matrix inversion operation.

10. The method of claim 7, wherein the input symbol estimates are obtained by applying a maximum ratio combining scheme to symbols received by the receiver.

11. The method of claim 7, wherein the calculation of error values comprises: constructing maximum likelihood Gaussian distribution functions based on the input symbol estimates and the input symbol variances; calculating soft symbol estimates based on the likelihood Gaussian distribution functions; and computing error values based on the difference between the input symbol estimates and the soft symbol estimates.

12. The method of claim 7, wherein the refined symbol estimates are calculated by weighting the soft symbol estimates based on the current and previous iterations based on the error values.

13. An apparatus for use in a wireless communication system comprising: a plurality of antennas; at least one processor coupled to the plurality of antennas and configured to perform processing of communications received via the antennas, as claimed in claim 7.

14. An apparatus for use in a wireless communication system comprising:

a plurality of antennas to receive signals;

a first module to obtain input symbol estimates and input symbol variances from the received signals;

a second module to calculate symbol errors for the input symbol estimates; and a third module to calculate refined symbol estimates based on the calculated symbol errors and the input symbol estimates, wherein the apparatus is integrated with a polar code decoder.

* * * * *